United States Patent [19]

Rice et al.

[11] 4,041,973
[45] Aug. 16, 1977

[54] QUICK CHANGE VALVE TRIM ASSEMBLY

[75] Inventors: Donald D. Rice; Herbert H. Walton, both of Marshalltown, Iowa

[73] Assignee: Fisher Controls Company, Marshalltown, Iowa

[21] Appl. No.: 574,176

[22] Filed: May 2, 1975

[51] Int. Cl.² .............................................. F16K 43/00
[52] U.S. Cl. .................................... 137/315; 251/61.5
[58] Field of Search .................. 137/315, 454.5, 454.6; 251/61, 61.2, 61.5, 214, 221, 222, 225, 62, 63, 63.4, 63.5, 63.6, 318

[56] References Cited

U.S. PATENT DOCUMENTS

| | | | |
|---|---|---|---|
| 58,503 | 10/1866 | Stierle et al. | 251/221 |
| 1,183,790 | 5/1916 | Allen | 251/222 |
| 2,230,434 | 2/1941 | Porter | 137/315 |
| 2,643,849 | 6/1953 | Davis | 251/222 |
| 2,692,750 | 10/1954 | Davis, Jr. et al. | 251/222 |
| 2,883,145 | 4/1959 | Sage | 251/214 |
| 3,331,583 | 7/1967 | Baker | 251/63.5 |
| 3,389,717 | 6/1968 | Povalski | 137/315 |
| 3,489,166 | 1/1970 | Williams | 137/315 |

Primary Examiner—Martin P. Schwadron
Assistant Examiner—G. L. Walton
Attorney, Agent, or Firm—Lawrence L. Limpus; James C. Bolding

[57] ABSTRACT

Disclosed herein is a valve trim assembly wherein a valve cage member and a valve plug are provided which cannot be independently rotated. A valve stem is affixed to the plug and extends out of the cage. The cage and the stem are threaded for attachment to a valve bonnet and an actuator, respectively, and by rotation of the cage, the cage is attached to the bonnet and the stem is attached to the actuator simultaneously. The stem is prevented from unscrewing from the actuator while the valve is in use, by means of the anti-rotation feature. The trim assembly can thus be installed in, or removed from, a valve quickly and with a minimum number of tools.

5 Claims, 4 Drawing Figures

QUICK CHANGE VALVE TRIM ASSEMBLY

BACKGROUND OF THE INVENTION

1. Field of the Invention

This invention relates generally to valve trim assemblies for control valves or the like.

2. Description of the Prior Art

It is well known that control valves, particularly those which are employed to achieve high pressure drops, will suffer damage or wear to their internal parts. This damage may be caused for example by cavitation or by erosion. It is also well known that the stem packing in such a valve may become worn and begin to leak.

In the event that the valve trim or packing becomes worn or damaged, the valve must be disassembled and the worn or damaged parts replaced. Quite often, such disassembly and replacement must be accomplished quickly with a minimum of equipment, by personnel who may be unskilled in the adjustment of control valves for proper operation.

Heretofore, it has been common to provide, in a control valve, a valve seat which is retained in a valve body, and a valve bonnet in which a valve stem is slidably received, the bonnet being retained on the body by means of bolts or a threaded connection. The valve stem is provided at its interior end with a plug which seats against the valve seat for preventing or selectively regulating flow of fluid through the valve. The end of the valve stem which extends exteriorly of the valve bonnet is connected to a diagragm, and control air pressure acting on this diaphragm is used to vary the valve plug position. The connection of the valve stem to the diaphragm has been made in a number of ways, such as by screwing the outer end of the valve stem into a threaded connector which is affixed to the diaphragm assembly, but it has been necessary to make this connection in such a way that the valve stem cannot rotate, and thereby unscrew from the diaphragm, while the valve is in use. To prevent valve stem rotation, it has been common to employ a jam nut which must be screwed onto the threaded outer end of the valve stem, which is then screwed into a threaded connector affixed to the diaphragm. The jam nut is then screwed tightly against the connector to lock the valve stem against rotation.

In order to replace the trim in such a prior art valve, it has been necessary to employ special tools for installation of the valve seat in the valve body and for installation of the valve stem. Moreover, it has been necessary to use care in reinstalling the valve bonnet on the valve body to insure that the valve plug and valve seat are properly aligned and adjusted to insure proper stroke and tight shutoff.

SUMMARY OF THE INVENTION

The general purpose of this invention is to provide a valve trim assembly which can be quickly removed from a valve and replaced.

A further object of this invention is to provide a valve trim which can be installed in, or removed from, a valve body using a minimum of tools.

Another object is to provide a valve trim in which the valve plug and the valve seat are maintained in alignment during installation, to insure proper seating of the plug in operation.

A still further object is to provide a valve trim in which the valve stem is secured against rotation when installed, to prevent disengagement of the stem from the actuator while the valve is in use.

Yet another object is to provide a valve trim which can be replaced by personnel who are unskilled in valve maintenance, without fear of damage to the valve plug or seat.

To achieve these, as well as other objects, we provide a valve trim which includes a valve cage having a seat on its interior surface, and a valve plug retained within the cage in such a way as to be reciprocable toward and away from the valve seat, but so as not to be rotatable independently of the cage. The cage is provided with threads on its outer surface at one end, and the valve plug is retained on a valve stem which extends out of the cage through its threaded end. The valve stem is threaded on the end which extends out of the cage.

A valve bonnet is provided which has a bore communicating from its interior to its exterior surfaces for receiving the valve stem. This bore is provided with an enlarged portion extending from its interior surface, and into this enlarged portion is inserted a suitable valve stem packing for preventing leaks around the valve stem while the valve is in use. The innermost portion of the bonnet bore is threaded to receive the external threads of the valve cage, for securing the cage to the bonnet in alignment with the bore.

A valve actuator is mounted on the external surface of the bonnet, this actuator including a pressure-actuated diaphragm which is provided with a central diaphragm adaptor. This adaptor is provided with a threaded hole, aligned with the bonnet bore, for receiving the outer threaded end of the valve stem.

To replace the trim in a valve according to this invention, the valve bonnet, which may normally be secured to the valve body by any suitable means, is removed from the valve body. The cage to be removed which will then be exposed, may be unscrewed from the threaded portion of the bonnet bore and, by virtue of the non-rotatability of the cage with respect to the plug, this unscrewing of the cage will simultaneously unscrew the valve stem from the diaphragm adaptor of the actuator. The stem, plug, and cage may then be removed from the bonnet, the stem being withdrawn through the bonnet bore by slipping it through the stem packing. To install a new trim, the process is reversed: the stem is inserted through the packing, and the threaded portions of the stem and cage are screwed as a unit into the respective threaded portions of the diaphragm adaptor and the bonnet bore. In this way, alignment of the cage, stem, and plug is maintained, and damage to the seating surface of the plug, due to installing the plug and stem into the diaphragm adaptor by means of a wrench, is avoided. Moreover, when the valve is reassembled, the stem cannot unscrew in use from the diaphgram adaptor, because it is constrained against rotation independently of the cage, and means are provided to prevent the cage from rotating in the valve body.

BRIEF DESCRIPTION OF THE DRAWINGS

Referring now to the drawings.

DESCRIPTION OF A PREFERRED EMBODIMENT

Figure 1:
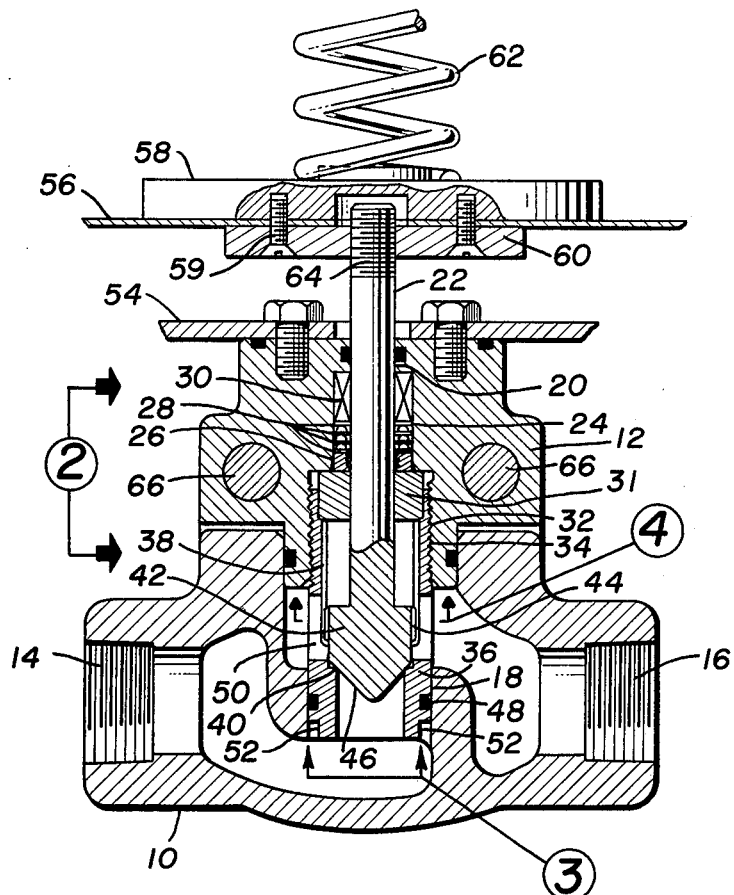
FIG. 1 is a cross-sectional view of a valve illustrative of this invention, including a partial sectional view of the valve actuator.

In FIG. 1, there is shown a valve having a body 10 and a bonnet 12. The valve body 10 is provided with an inlet passageway 14, an outlet passageway 16, and a central bore 18 connecting the inlet and outlet passageways.

The valve bonnet 12 is provided with a bore 20 communicating from its interior to its exterior surfaces for receiving a valve stem 22. This bore 20 is provided with an enlarged portion 24 extending from its interior surface, and into this enlarged portion is inserted a suitable valve stem packing assembly of any desired conventional type, here shown as including a wiper ring 26, alternating wave and flat washers 28, and packing 30. This packing assembly in retained within the enlarged portion 24 by a guide bushing 31, which also serves to align the stem 22. The innermost portion 32 of the bonnet bore 20 is threaded to receive external threads 34 on one end of a valve cage 36, for securing the cage 36 to the bonnet 12 in alignment with the bore 20.

Figure 3:
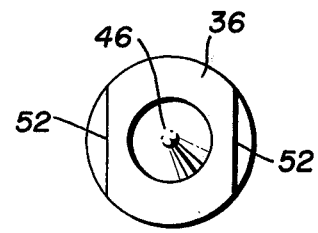
FIG. 3 is a view of the cage of the valve of FIG. 1 across the line 3—3 of FIG. 1.

The valve cage 36 of this embodiment is provided with an internal bore which, as can be more clearly seen in FIG. 4, includes a portion 38 which is hexagonal in cross-section above a valve seat 40 and which, as is shown in FIG. 3, is round in cross section below the valve seat 40.

Figure 4:
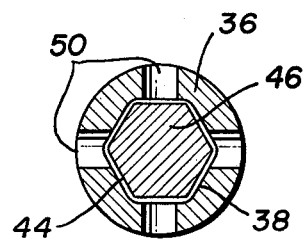
FIG. 4 is a sectional view of the cage and plug taken across the line 4—4 of FIG. 1.

Received within this valve cage 36 is a valve plug 42 retained on the lower end of the stem 22, and as is shown in FIG. 4, this plug includes an upper portion 44 which is hexagonal in cross-section so as to be slidably received within the hexagonal portion 38 of the cage 36 but so as not to be rotatable therein independently of the cage. The plug 42 is provided with a conical portion 46 which seals against the valve seat 40 to close the valve.

The outer surface of the valve cage 36 is provided near its lower end with an annular groove for receiving an O-ring seal 48 for sealing between the outer surface of the cage and the valve inlet to prevent leakage through the valve when closed. The wall of the cage 36 is provided with four ports 50 communicating between the inside and the outside of the cage for fluid flow when the valve plug is moved to a valve-open position. The lower end of the cage 36 is further provided with a pair of opposed flat surfaces 52, by which the cage may be gripped by a suitable wrench for screwing the threaded portion 34 of the cage into the threaded portion 32 of the valve bonnet 12 during assembly of the valve.

A suitable conventional valve actuator assembly is mounted on the top of the valve bonnet 12, this actuator including a lower casing 54, a diaphragm 56, an upper casing (not here shown), and a diaphragm return spring 62. The diaphragm 56 is retained at its periphery between the upper and lower casings in a conventional manner, while the spring 62 is retained at its upper end by suitable conventional means (not shown) within the upper casing and at its lower end by a diaphragm plate 58 centrally affixed to the top of the diaphragm 56 by means of a diaphragm adaptor plate 60 and screws 59. The diaphragm adaptor plate is equipped with threads for receiving a threaded end portion 64 of the valve stem 22. It will be understood by those skilled in the art that gas pressure is introduced between the lower side of the diaphragm 56 and the lower actuator casing 54 by suitable means, and that this gas pressure acting on the diaphragm is used in conjunction with the force provided by the spring 62 to vary the position of the valve stem 22 and plug 42 to open and close the valve.

Figure 2:
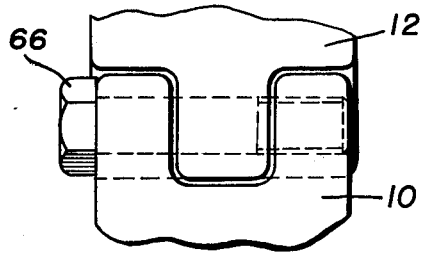
FIG. 2 is a view of the valve of FIG. 1 taken across the line 2—2 thereof.

Any suitable means may be used to retain the bonnet 12 on the body 10, but one such arrangement shown in FIGS. 1 and 2 employs a simplified cross-bolting technique wherein the body 10 and the bonnet 12 are held in sealing engagement by the crossbolts 66.

To install a trim according to this invention in a control valve, the bonnet and actuator assembly may be inverted and the packing 30, washers 28, and wiper ring 26 are installed in the bonnet bore 24. The guide bushing 31 is then placed over the valve stem 22, and the valve plug 42 is installed in the bore of the cage 36. The valve stem 22 is then inserted through the packing assembly and the bonnet bore 20 until the stem threaded portion 62 abuts the diaphragm adaptor plate 60, and the cage threaded portion 34 abuts the threaded portion 32 of the bonnet bore. The valve cage 36 may then be screwed into the bonnet 12 by means of a wrench gripping the opposed flat surfaces 52 on the lower portion of the cage 36, and, as the cage is screwed into the bonnet, the valve stem threaded portion 64 is simultaneously screwed into the threaded diaphragm adaptor 60, the stem being forced to turn by means of the interior hexagonal portion 38 driving the upper hexagonal portion 44 of the valve plug 42. The cage 36 is screwed tightly into the bonnet 12, and the jamming action of the cage threads 34 against the bonnet threads 32 prevents both the cage and the stem from unscrewing from the bonnet and the diaphragm adaptor, respectively, after the valve has been placed in service. Following installation of the trim in the bonnet 12 in this manner, assembly of the valve is completed by inserting the cage 36 into the bore 18 of the valve body 10, and installing the crossbolts 66 to retain the bonnet 12 on the body.

Desirably, the pitch of the threads 34 on the cage 36 is greater than the pitch of the threads 64 on the upper end of the valve stem 22, so that in screwing the cage 36 into the bonnet 12 the diaphragm and diaphragm adaptor are moved away from the valve bonnet as the trim is installed. The diaphragm adaptor will thus be positioned somewhat away from the lower actuator casing 54 when the valve is closed, and the diaphragm spring 62 is compressed slightly, whereby adequate seating force is insured for holding the valve plug 42 against the cage seat 40 to achieve tight shutoff when the valve is closed.

To disassemble the valve for maintenance or trim replacement, the assembly process is reversed: the crossbolts 66 are removed, the bonnet 12 and cage 36 are removed from the body 10, and the cage 36, plug 42, and stem 22 are unscrewed from the bonnet as a unit.

It will be observed that when the cage and stem have been unscrewed from the bonnet, the guide bushing 31 and packing elements 26, 28, and 30 may be removed from the bonnet bore 20 for inspection and replacement if necessary, without removing the actuator casing 54 from the bonnet 12 as has been required in many prior art valves.

Having thus described a preferred embodiment of this invention, it will be seen that there is provided a valve trim assembly which can be quickly and conveniently removed from, or installed in, a valve using a minimum number of tools by personnel who are largely unfamiliar with normal valve maintenance procedures. Moreover, use of this trim insures that the valve cage and the plug and stem remain in proper alignment during installation, and that the seating surface of the valve plug is not damaged during installation by use of a wrench thereon. Further, in a valve trim according to this invention the stem is secured against rotation to prevent unscrewing from the diaphragm assembly in use.

Having thus described a preferred embodiment of our invention, many variations and modifications thereof will occur to those skilled in the art in the light of the above teachings. For example, the bore of the valve cage may be circular in cross-section, rather than hexagonal, and may be provided with a longitudinally-extending slot in which a pin carried by a circular valve plug rides to prevent rotation of the valve plug and stem relative to the cage. Further, other methods of securing the cage member and stem against unscrewing from the bonnet may be employed, such as by the use of a shoulder in the valve body bore against which the cage bottom abuts when the valve is assembled. It is therefore to be understood that this invention may be practiced otherwise than as herein specifically described.

We claim:

1. A valve trim structure, comprising:
   a unitary cage member having an inner surface and an outer surface, and a valve seat on said inner surface,
   a plug member received within said cage member and reciprocable therein toward and away from said seat;
   a stem member having a first end affixed to said plug member and having a second end extending out of one end of said cage member;
   means for preventing relative rotation of said cage and said plug and stem members,
   said second end of said stem being threaded for attachment to actuator means external of a valve; and
   a valve bonnet;
   said one end of said cage member from which said stem member extends being threaded for attachment to said valve bonnet;
   whereby by turning said cage member, said threaded end of said cage member is affixed to said valve bonnet, while said stem member and said plug member are simultaneously turned by said cage member to affix said second end of said stem member to said external actuator means.

2. A valve trim according to claim 1, further including means for preventing said cage member from unscrewing from said bonnet after installing said trim structure in said valve.

3. A valve trim according to claim 2 wherein said threaded end of said cage is provided with threads of greater pitch than the threads on said threaded end of said stem.

4. A valve according to claim 2, wherein said outer surface of said cage member is provided with substantially parallel, diametrically opposed surfaces for engaging a wrench for installation of said cage and said stem into said bonnet.

5. In a control valve comprising a valve body having a central bore communicating with the exterior of said body and an inlet and an outlet communicating with said bore; a valve bonnet mountable on said body and having a portion covering said bore; and an actuator mounted on said bonnet, a valve trim comprising:
   a unitary cage member having a first end sealably fitting into said body bore and a second end threadedly engaging said portion of said bonnet covering said bore, said cage member further having an inner surface and an outer surface;
   a stem member extending through said bonnet from said actuator into said central bore of said body in alignment with said cage and having an outer end threadedly engaging said actuator;
   a plug member retained on said stem member within said inner surface of said cage member; and
   means on said plug for engaging said inner surface of said cage for preventing rotation of said plug and stem independently of rotation of said cage;
   whereby said trim may be removed from said valve as a unit by unscrewing said cage from said bonnet, rotation of said cage causing rotation of said plug and stem to unscrew said stem from said actuator.

* * * * *